United States Patent [19]

Perona

[11] Patent Number: 5,612,837
[45] Date of Patent: Mar. 18, 1997

[54] SNAP-IN CHASSIS FOR TAPE DRIVE

[75] Inventor: Mark W. Perona, San Diego, Calif.

[73] Assignee: Iomega Corporation, Roy, Utah

[21] Appl. No.: 543,133

[22] Filed: Oct. 13, 1995

Related U.S. Application Data

[63] Continuation-in-part of Ser. No. 531,718, Sep. 21, 1995.
[51] Int. Cl.$^6$ .............................. G11B 5/008; G11B 15/60; G11B 33/00
[52] U.S. Cl. .............................................. 360/93; 360/96.5
[58] Field of Search ................................ 360/97.01–98.01, 360/90, 93, 96.1, 96.5, 137

[56] References Cited

U.S. PATENT DOCUMENTS

| | | | |
|---|---|---|---|
| 4,310,870 | 1/1982 | Kia et al. | 361/801 |
| 4,866,552 | 9/1989 | Nagase | 360/96.1 |
| 5,025,334 | 6/1991 | Perona | 360/93 |
| 5,025,335 | 6/1991 | Stefansky | 360/97.01 |
| 5,109,308 | 4/1992 | Kukreja et al. | 360/93 |
| 5,210,664 | 5/1993 | Perona | 360/93 |
| 5,235,474 | 8/1993 | Searle | 360/92 |

*Primary Examiner*—Jefferson Evans
*Attorney, Agent, or Firm*—Woodcock Washburn Kurtz Mackiewicz & Norris

[57] ABSTRACT

A magnetic tape drive for reading and writing data on magnetic tape in a cartridge of the type in which a driven roller in the cartridge moves tape towards a read/write head in the drive which has a one-piece molded chassis. The chassis is suspended at three points in the pan. At each point an interference fit between a planar mounting member on the chassis and a slot in a support member in the pan provides an easy snap-in mounting for the chassis.

11 Claims, 8 Drawing Sheets

SNAP-IN CHASSIS FOR TAPE DRIVE

RELATED APPLICATIONS

This application is a continuation-in-part of U.S. application Ser. No. 08/531,718 filed Sep. 21, 1995 (Attorney's Docket No. IOTA-0051) entitled "Snap-In Chassis for Tape Drive" by Mark W. Perona.

This application is related to applications HEAT DIFFUSER FOR MAGNETIC TAPE DRIVE, Perona, Ser. No. 08/543,127, filed Oct. 13, 1995 (Attorney Docket No. IOTA-0059); OPENING LEVER FOR MAGNETIC TAPE CARTRIDGE DOOR, Perona, Ser. No. 08/543,134, filed Oct. 13, 1995, (Attorney Docket No. IOTA-0061) and CLIP FOR ATTACHING TAPE DRIVE MOTOR TO CHASSIS, Perona, Ser. No. 08/543,128, filed Oct. 13, 1995, (Attorney Docket No. IOTA-0062) which are incorporated herein by reference.

BACKGROUND OF THE INVENTION

This invention relates to a magnetic tape drive, and more particularly, to a chassis which can be snapped into the pan of a tape drive for easy assembly.

U.S. Pat. No. 5,210,664-Perona shows a tape drive for use with so-called "Mini-Data" cartridges. There are standards for these drives so that drives manufactured by different companies can read and write data interchangeably. These standards are referred to as the "QIC" (Quarter-Inch Cartridges) standards. One set of standards is referred to as the "QIC-80 Standards for 250–800 megabyte products."

Recently, a new wide tape cartridge referred to as "TRAVAN" has been announced for use with such drives. The Travan cartridge has a metal base plate which is a reference for all cartridge/drive interface specifications.

It is an object of the present invention to provide an easily assembled tape drive for use with such cartridges.

SUMMARY OF THE INVENTION

In accordance with the present invention, a magnetic tape drive has a one-piece molded chassis which can be snapped into the pan to mount the drive. The chassis is mounted in the pan by snapping it into a three point suspension. This three point suspension has an interference fit between slots in three upstanding members in the pan and three planar members on the chassis.

The snap-in mounting of the chassis has the advantage of ease of assembly. There are no threaded connections and no holes or screws to be assembled. The one-piece chassis is molded of plastic and is of a shape which minimizes the material which is used. The three point suspension of the chassis in the pan has the advantage of greater stability. It is difficult to twist the chassis which would otherwise change the relationship of the components mounted thereon. If one point of suspension is changed, the chassis moves in its entirety, without twisting.

The three-point suspension also has the advantage of saving chassis material because corners necessary for a four-point or greater suspension can be eliminated.

Further, in accordance with the invention, the front of the chassis is locked to the bezel. Two tabs on the front of the chassis fit into slots in the bezel. The cartridge is inserted into the drive through the bezel. By locking the front of the chassis to the bezel, a reference between the baseplate of the cartridge and the chassis is established. The chassis "floats" with the bezel as a reference. This references all components on the chassis to the baseplate of the cartridge.

The foregoing and other objects, features and advantages of the invention will be better understood from the following more detailed description and appended claims.

DESCRIPTION OF THE PREFERRED EMBODIMENT

Figure 1:
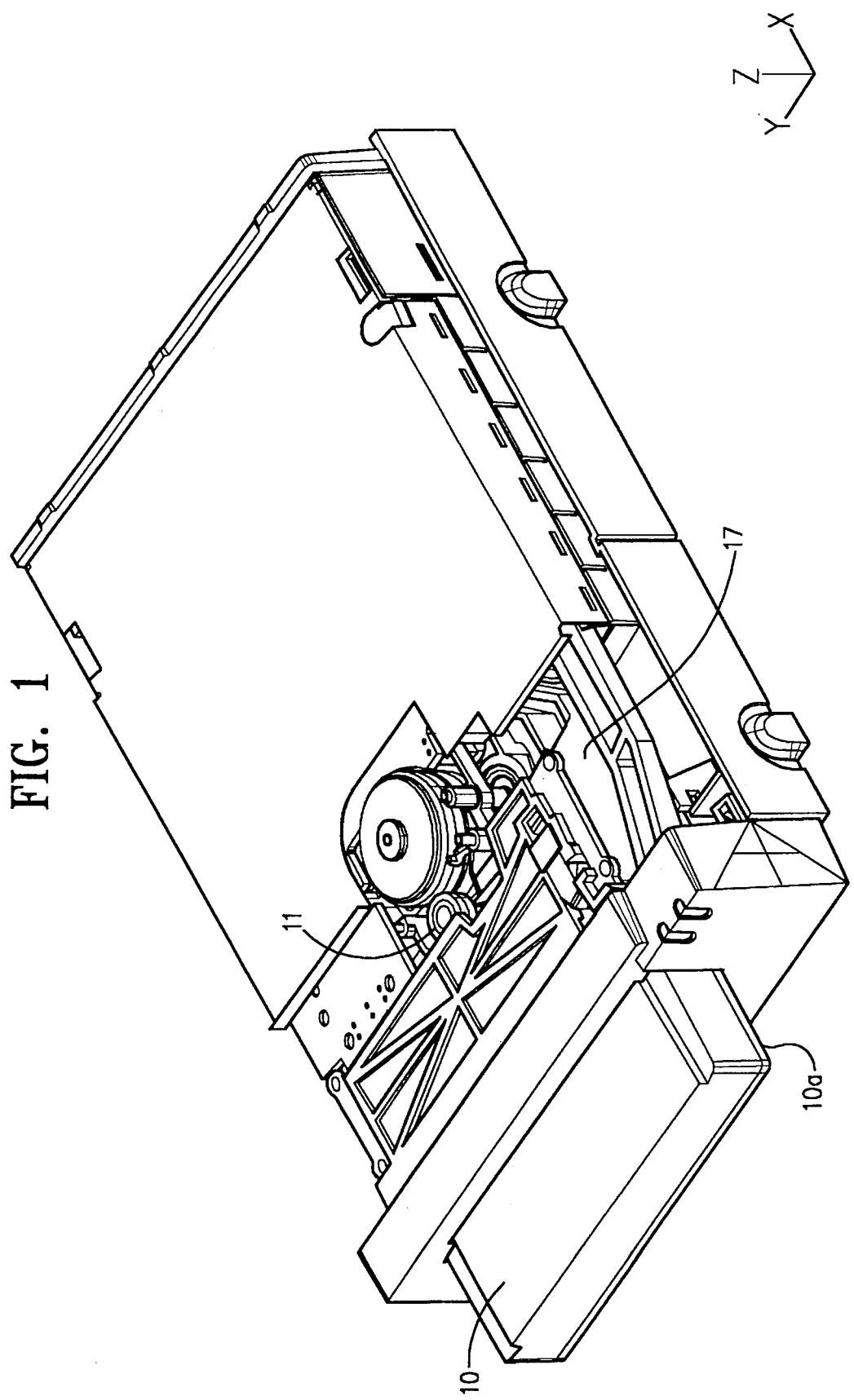
FIG. 1 is a perspective view of the drive and the cartridge.
Figure 2:
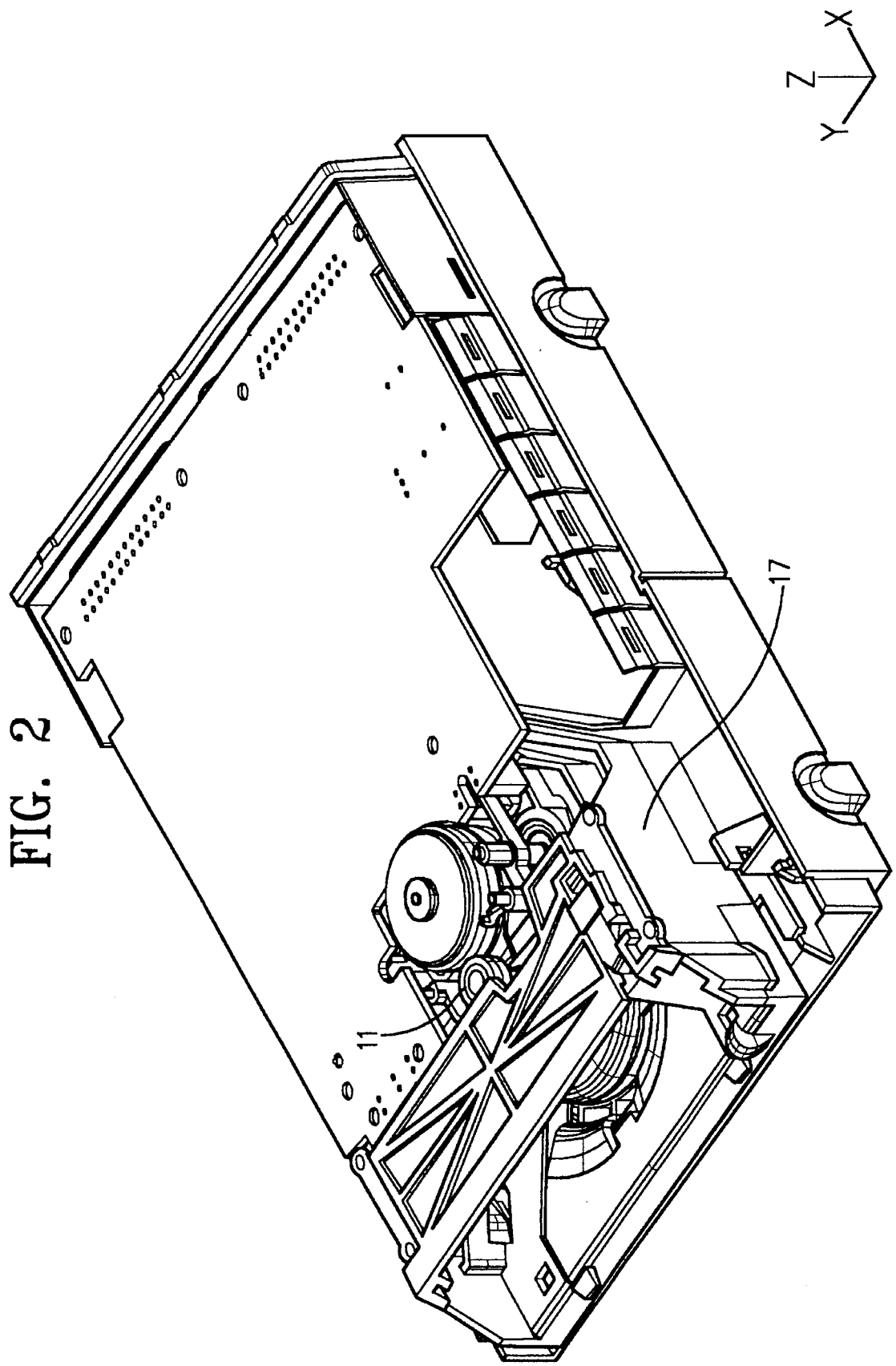
FIG. 2 is another perspective view of the tape drive of the present invention.
Figure 9:
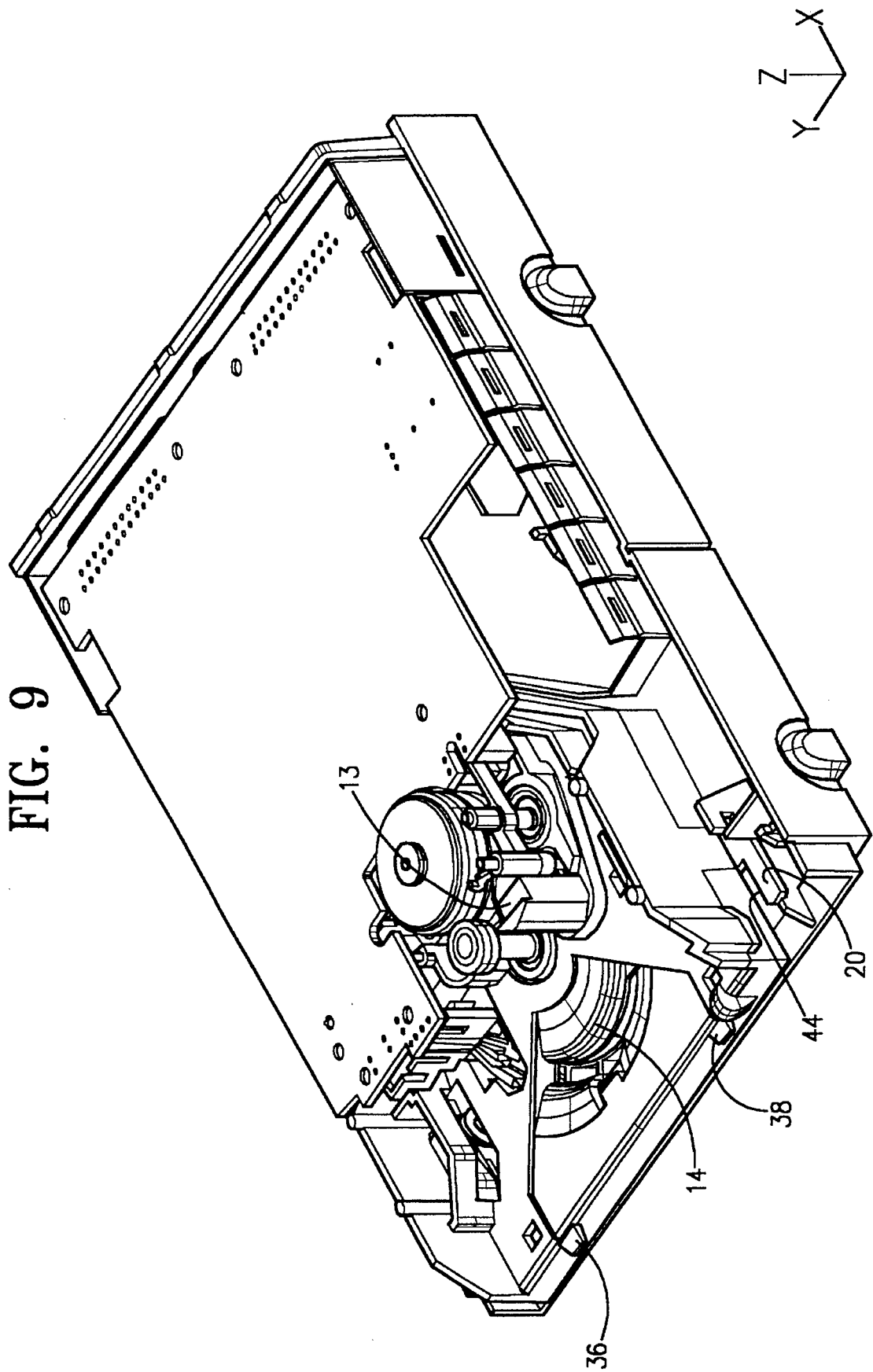
FIG. 9 is also similar to FIG. 2 but broken away differently.

FIG. 1 shows a tape drive of the type for use with cartridges 10 having a metal baseplate 10a. The drive includes a drive roller 11 which engages a driven roller in the cartridge to move magnetic tape in the cartridge. The tape is read by a magnetic head 13 (FIG. 9) in the drive.

Motor 14 (FIG. 9) is mounted beneath the one-piece molded chassis 17.

Figure 3:
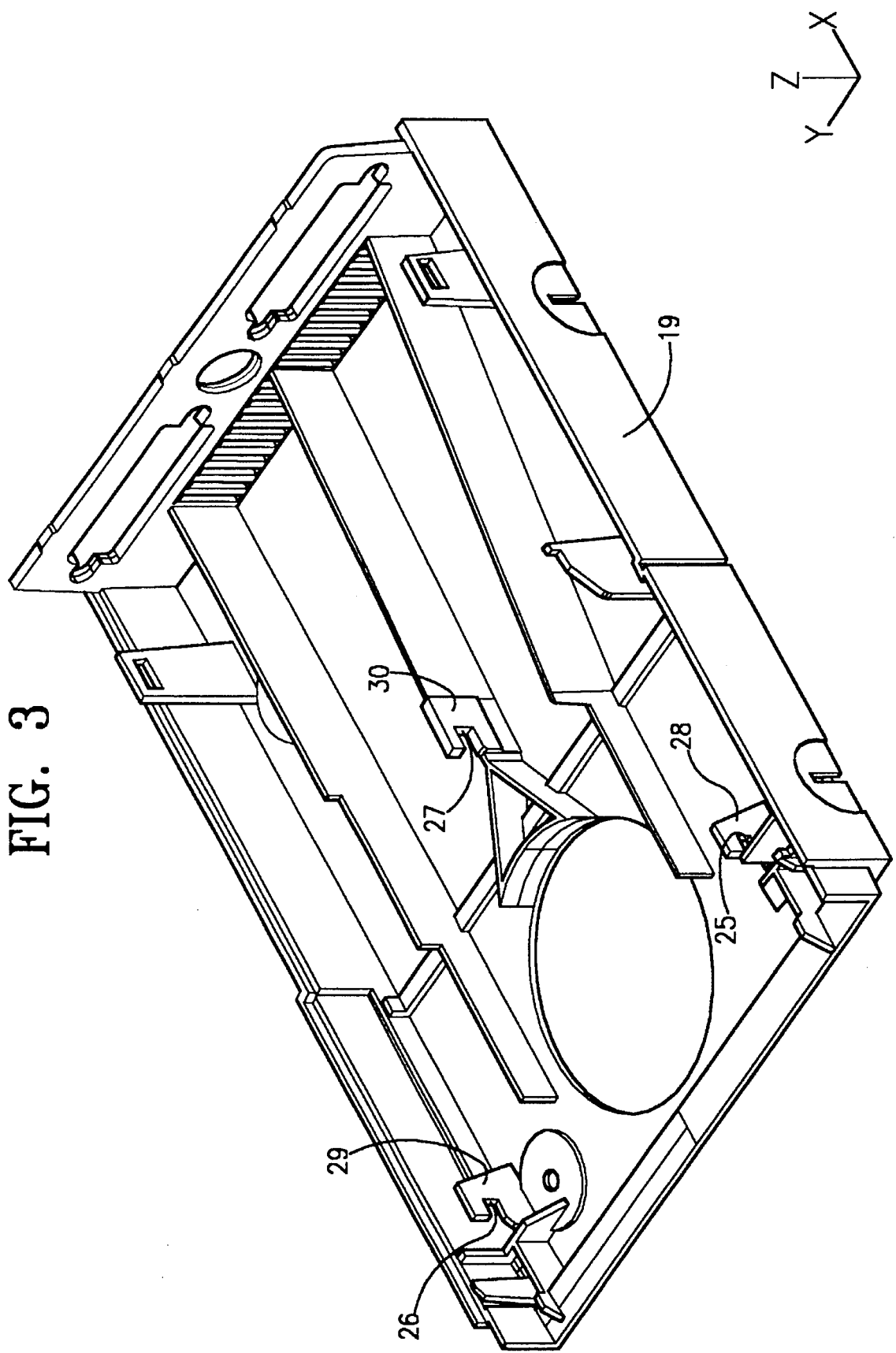
FIG. 3 is a perspective view of the pan.

In accordance with the invention, the one-piece molded chassis 17 has a three point interference fit suspending it in the pan 19 (FIG. 3). Pan 19 mounts the tape drive in relation to other components. For example, these tape drives are often used in conjunction with personal computers and other peripherals which are mounted in a rack. Molded plastic pan 19 and its case are typically mounted in the 5¼ inch peripheral slot of a personal computer.

Figure 4:
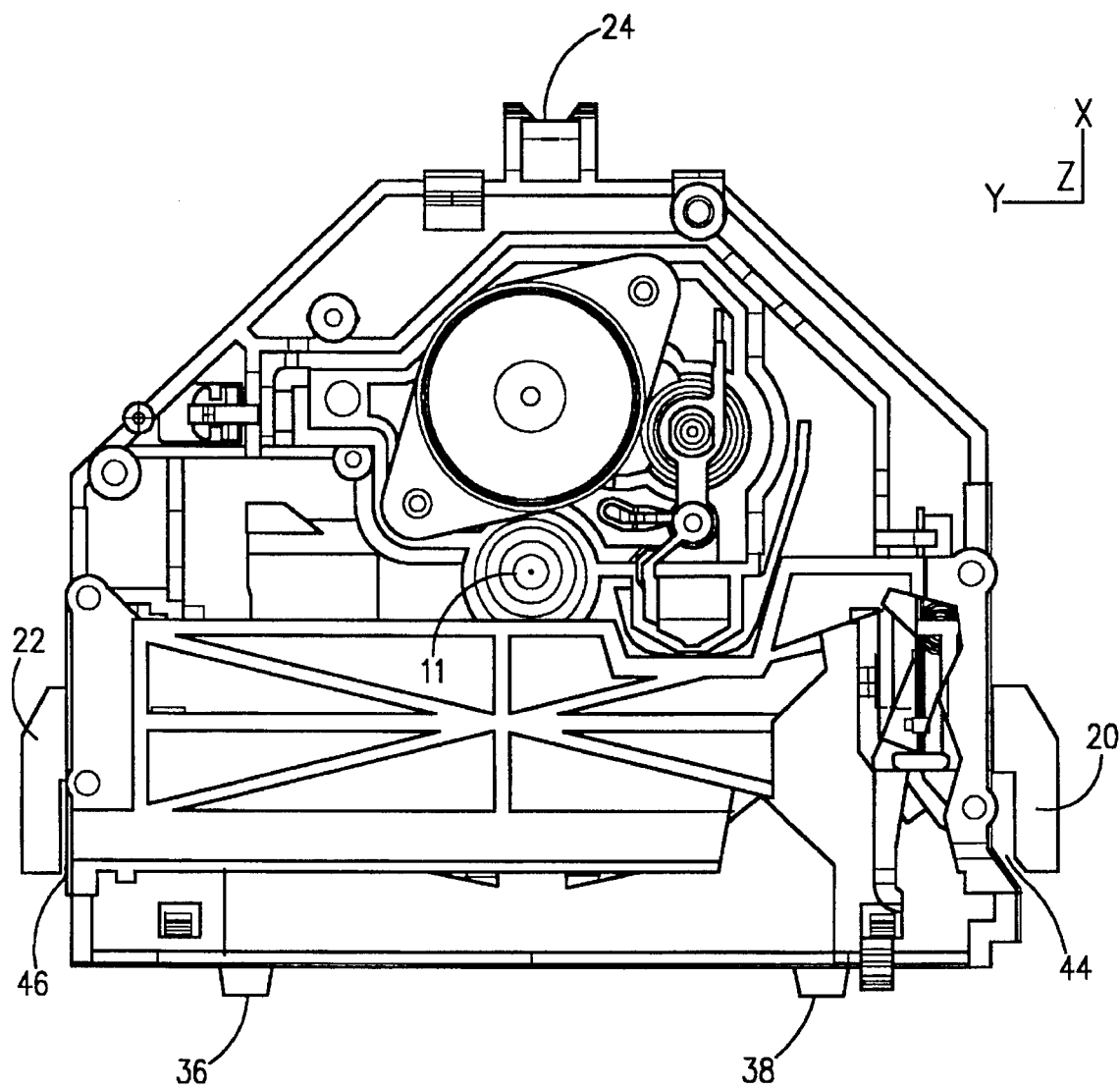
FIG. 4 is a top view of the chassis.
Figure 5:
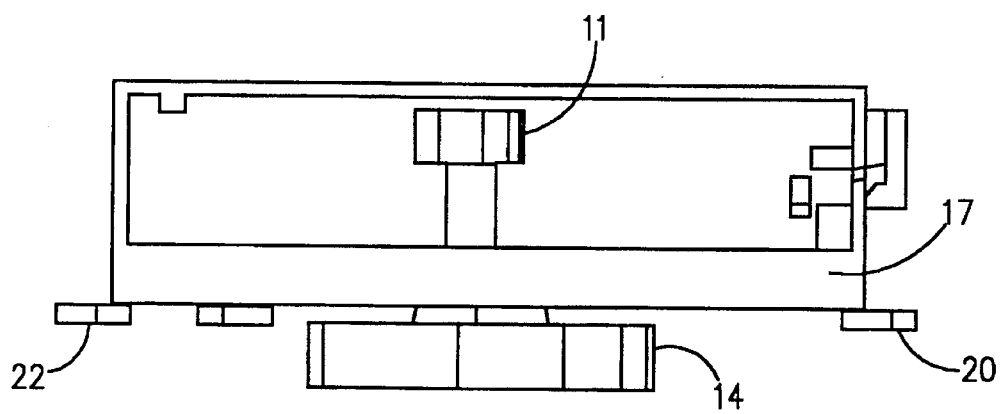
FIG. 5 is a front view of the chassis.

The chassis 17 has three horizontal planar mounting members 20, 22 and 24 (FIG. 4). These snap into slots 25–27 in upstanding mounting members 28–30 on the pan. Each of the planar mounting members on the chassis fit into slots in the upstanding mounting members in the pan with an interference fit.

Figure 6:
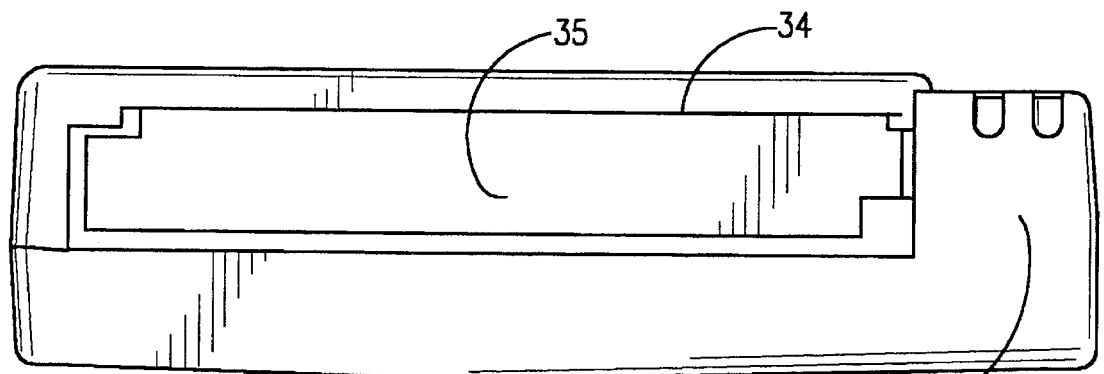
FIG. 6 is a front view of the bezel.
Figure 7:
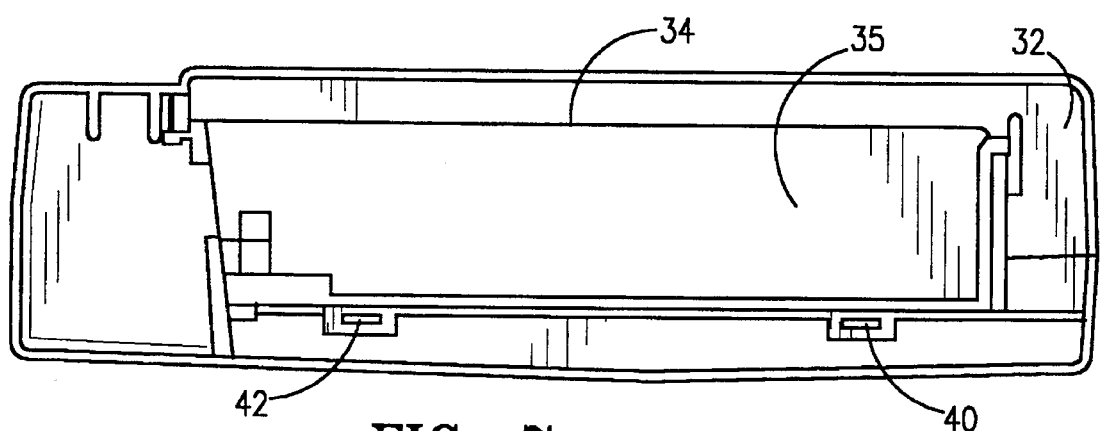
FIG. 7 is a back view of the bezel.
Figure 8:
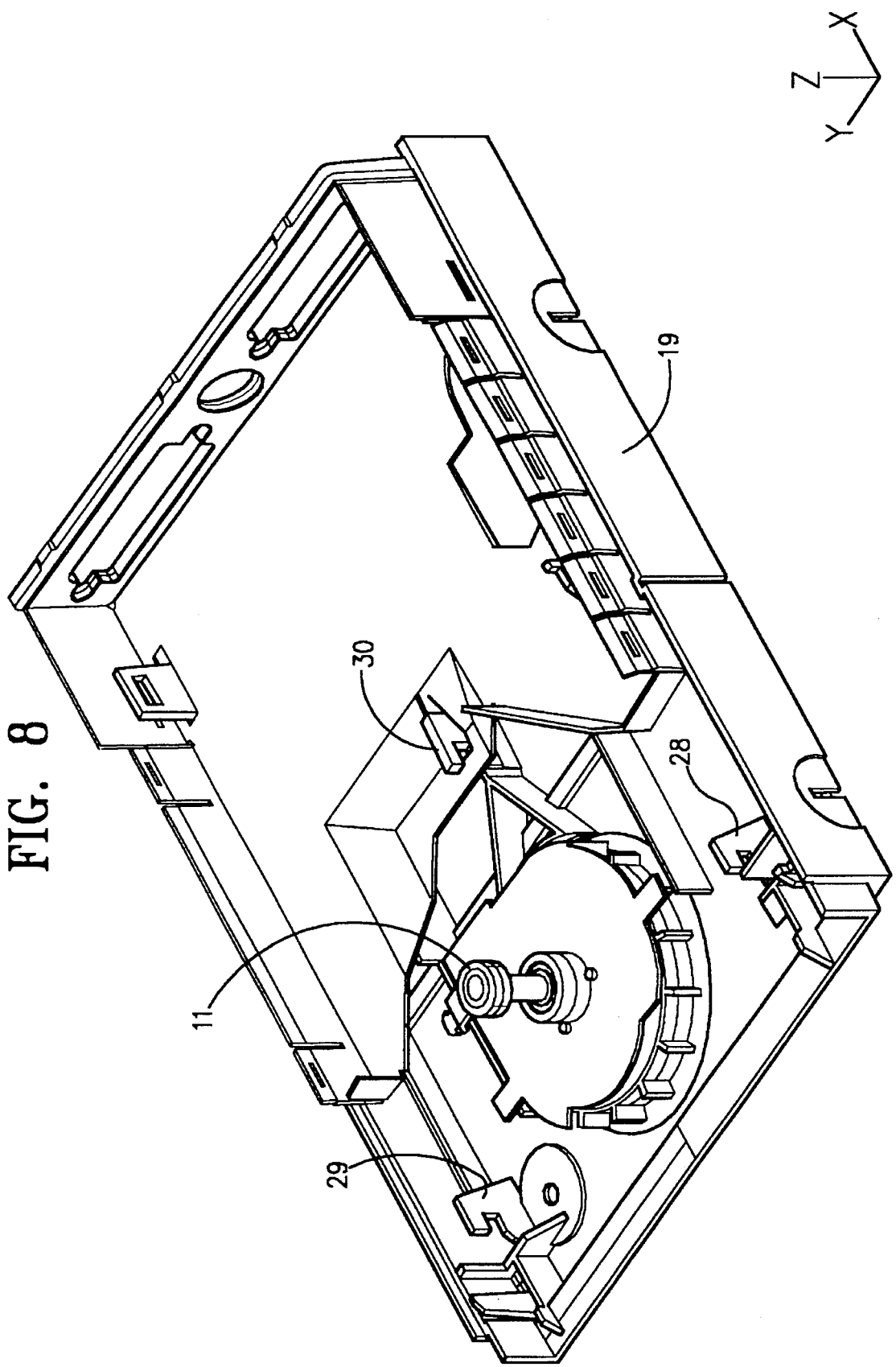
FIG. 8 is similar to FIG. 2 but broken away.
Figure 10:
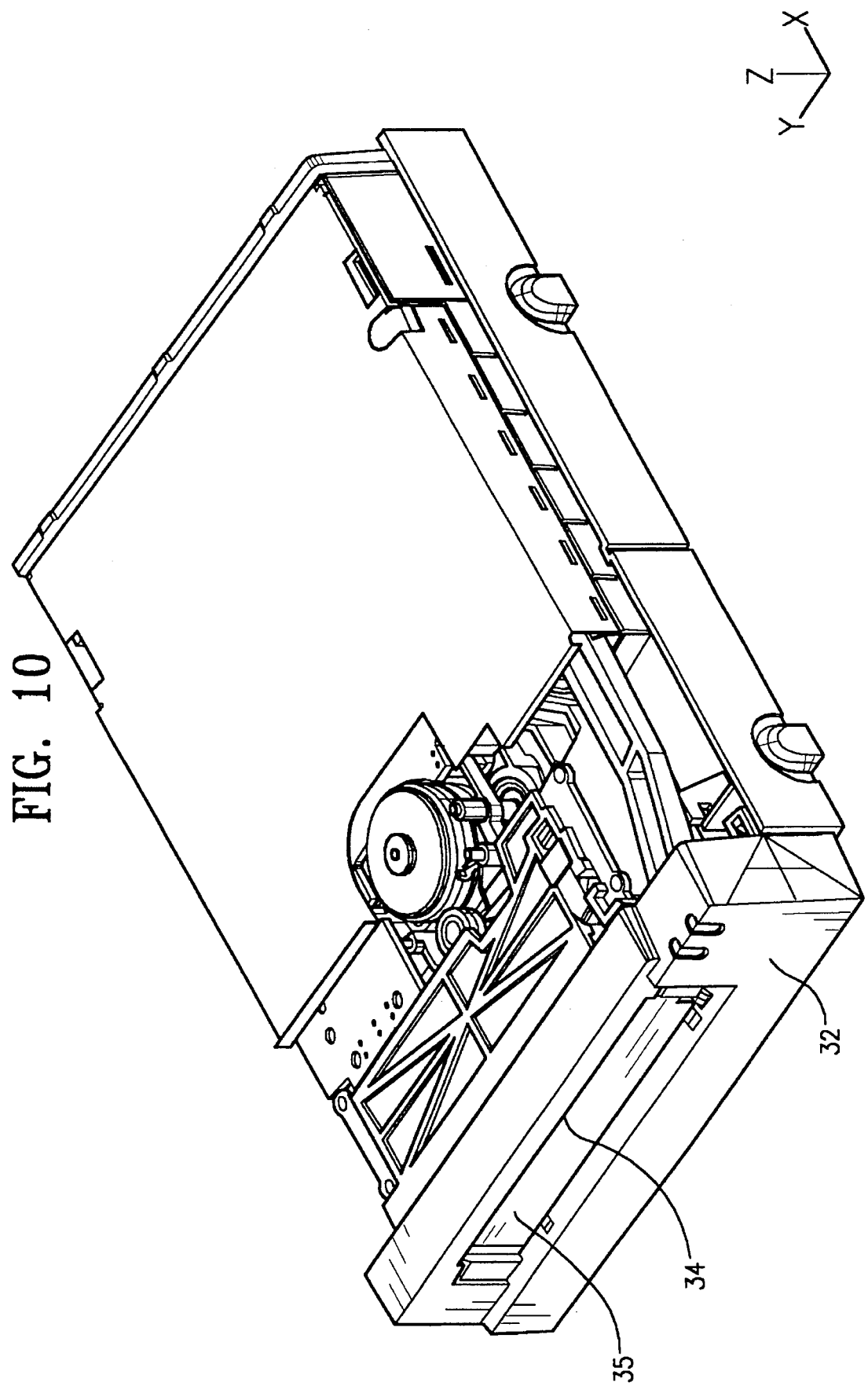
FIG. 10 is also similar to FIG. 2 but broken away differently.

As shown in FIGS. 6, 7 and 10, a bezel 32 has an opening 34 through which the tape cartridge 10 is inserted into the drive. (Opening 34 is closed by the top hinged door 35 in the views of FIGS. 6, 7 and 10.) Further in accordance with the invention, the bezel is referenced and locked to the front of the chassis. Prongs 36 and 38 (FIGS. 4 and 9) on the chassis fit into slots 40 and 42 (FIG. 7) in the bezel. This provides a good, stable relationship between the cartridge baseplate 10a and the chassis.

The mounting of the chassis in the pan is flexible so that the chassis floats with respect to the bezel. The planar members 20 and 22 are separated from the chassis by the slots 44 and 46 so that there is a single flexible point of suspension for each of the planar members 20 and 22 (FIG. 4). The chassis can flex up and down on these suspension points so that the reference between the front of the chassis, on which the cartridge baseplate 10a rests is fixed with respect to bezel 32.

Upstanding mounting member 30 (FIG. 3) has a slot 27 which provides a slightly looser interference fit with the planar mounting member 24 (FIG. 4) on the chassis. This accommodates some movement of the chassis at this point, again allowing referencing the chassis to the bezel.

Various modifications may be made to the preferred embodiment. The appended claims are, therefore, intended to cover all such modifications within the true spirit and scope of the invention.

It is claimed:

1. A magnetic tape drive for reading/writing data on magnetic tape in a cartridge of the type in which a driven roller in said cartridge moves tape past a read/write head in said drive, said drive comprising:

a read/write head;

a motor having a drive shaft;

a drive roller driven by said drive shaft of said motor;

said drive roller engaging said driven roller through an opening in said cartridge when said cartridge is inserted into said drive to move said tape past said read/write head;

a one-piece molded chassis, said read/write head, said motor and said drive roller being mounted on said chassis;

a pan enclosing said drive for mounting said drive;

means on said chassis and on said pan for mounting said chassis in said pan in an interference fitting relationship; and keying means for referencing the front of said chassis to a bezel fitted on the front of said pan.

2. The magnetic tape drive recited in claim 1 wherein said means for mounting said chassis in said pan comprises:

three points of suspension for said chassis in said pan.

3. The magnetic tape drive recited in claim 2 wherein each point of suspension comprises:

means defining a slot on one of said chassis and pan; and a planar member fitting in said slot in an interference fit.

4. The magnetic tape drive recited in claim 1 wherein said means for mounting comprises:

an upstanding support member in said the pan, said support member having a horizontal slot therein.

5. The magnetic tape drive recited in claim 4 wherein said chassis has a horizontal planar member which has an interference fit with said slot.

6. The magnetic tape drive recited in claim 5 wherein said pan has three upstanding support members with a slot in each and wherein said chassis has three horizontal planar members fitting with interference fits in said slots.

7. The magnetic tape drive recited in claim 1 wherein:

said bezel having an opening through which said magnetic tape cartridge is inserted into said drive.

8. The magnetic tape drive recited in claim 1 or 7 wherein said keying means comprises:

two prongs on the front of said chassis; and two slots in said bezel for receiving said prongs to reference said chassis with respect to said bezel.

9. The magnetic tape drive recited in claim 1 or 7 wherein said means for mounting is flexible so that said chassis floats with respect to said bezel.

10. The magnetic tape drive recited in claim 9 wherein said means for mounting comprises:

an upstanding support member in said pan, said support member having a horizontal slot therein;

a horizontal planar member on said chassis having an interference fit with said slot, said planar member being joined to said chassis at a single flexible point of suspension, said planar member being otherwise separated from said chassis so that said chassis floats with respect to said bezel.

11. The magnetic tape drive recited in claim 10 wherein said means for mounting comprises an upstanding support member and one planar member on each side of said chassis, said mounting means further comprising an upstanding support member on said pan having a slot therein, and a mating planar member on the rear of said chassis, said last named planar member fitting into said last named slot with an interference fit which is sufficiently loose to allow said chassis to float with respect to said bezel.

\* \* \* \* \*